United States Patent Office 3,378,535
Patented Apr. 16, 1968

3,378,535
AZIRIDINYLMETHYL-ALKOXYMETHYL-MELAMINES

Joseph Adrian Hoffman, Bridgewater Township, Somerset County, and John Christian Oppelt, Manville, N.J., assignors to American Cyanamid Company, Stamford, Conn., a corporation of Maine
No Drawing. Filed Dec. 4, 1964, Ser. No. 416,151
5 Claims. (Cl. 260—82.1)

This invention relates to a new class of compounds. More particularly, it relates to N,N',N"-tris(1-aziridinylmethyl - N,N',N" - tris(alkoxymethyl)melamines of the formula:

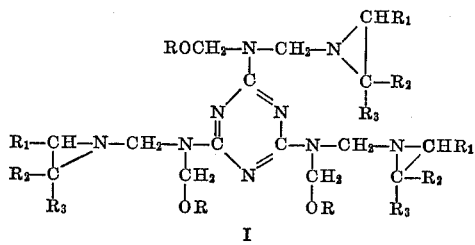

I wherein R is lower alkyl and $R_1$, $R_2$ and $R_3$ are hydrogen or lower alkyl. It also relates to the method of preparing the compounds of Formula I and to their use as cross-linking agents, particularly for elastomers.

The compounds of this invention can be prepared by reacting one mole of a N,N',N"-tris(halomethyl)-N,N',N"-tris(alkoxymethyl)melamine of Formula II with three moles of an ethyleneimine compound (i.e., an aziridine) of Formula III.

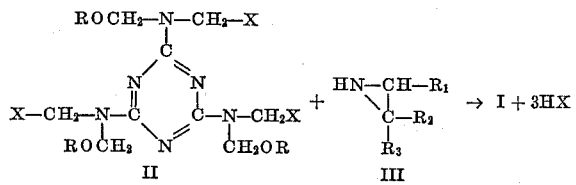

In Formula II, "X" is bromine or chlorine.

The N,N',N" - tris(halomethyl) - N,N',N" - tris(alkoxymethyl)melamine can be prepared by reacting N,N,N',N',N",N" - hexakis(lower alkoxymethyl)melamine with an acid bromide or acid chloride such as thionyl chloride, thionyl bromide, phosgene, acetyl bromide, etc. For example, N,N',N"-tris(chloromethyl)-N,N',N"-tris(methoxymethyl)melamine can be obtained by reacting N,N,N',N',N",N" - hexakis(methoxymethyl)melamine with phosgene. In a similar manner, N,N',N"-tris(chloromethyl) - N,N',N" - tris(ethoxymethyl)melamine, N,N',N" - tris(bromomethyl) - N,N',N" - tris(methoxymethyl)melamine, etc., can be obtained for use in preparing the compounds of this invention.

The ethyleneimines which may be used include ethyleneimine (or the alternate name, aziridine), 1,2-propyleneimine (or 2-methylaziridine), 1,2-butyleneimine (or 2-ethylaziridine), 2,3-butyleneimine (or 2,3-dimethylaziridine), 2-methyl-1,2-propyleneimine (or 2,2-dimethylaziridine), etc. The reaction between the halomethylmelamine compound and the ethyleneimine is carried out in a suitable inert solvent and in the presence of an acid binding agent.

The inert solvents include benzene, hexane, toluene, chloroform, carbon tetrachloride, methylene chloride, etc.

The acid acceptors or binding agents include aliphatic tertiary amines, such as trimethylamine, triethylamine, tri-n-propylamine, etc., and cyclic tertiary amines, such as pyridine, picoline, collidine, lutidine, etc.

Sufficient acid acceptor is used to combine with all the hydrogen halide formed during the reaction.

The reaction temperature should be below 30° C., preferably between 0° and 20° C. External cooling will normally be required to remove the heat of reaction and maintain the desired reaction temperature.

As stated above, at least three moles of the ethyleneimine compound are required, but it is often advantageous to use an excess of ethyleneimine compound, such as a 100% excess. The unreacted imine can be recovered.

Addition of the halomethyl-melamine compound to a mixture of the ethyleneimine compound and the acid acceptor is preferred. The reverse order of addition may also be used, but it is not as advantageous, since polymerization is sometimes encountered. Either or both of the reactants may be dissolved in the selected solvent.

The products may be isolated by any convenient method. For example, after filtration to remove insolubles, primarily hydrohalides of the acid acceptor, the filtrate is fractionally distilled to separate solvent, unreacted starting materials and product.

The compounds of this invention are normally stable, viscous liquids.

The products of this invention contain three aziridinyl groups and are reactive with monomeric and polymeric compounds having reactive hydrogens, including alcohols, phenols, mercaptans, thiophenols, carboxylic acids, amines, etc. They are thus useful as cross-linking agents in the preparation of plastics and resins, textiles, varnishes, paper, etc. For example, they are effective curing agents or chain-extending agents for vulcanizable rubbery materials which serve as binders in solid rocket propellant compositions. Rubbery materials include homopolymers of conjugated dienes and copolymers of conjugated dienes with materials copolymerizable therewith, as shown in U.S. Patent 3,087,843. Of particular interest is their use in propellant compositions comprising an inorganic oxidizing salt and either a synthetic acid-terminated polymeric binder or a synthetic copolymer of a conjugated diene and an unsaturated carboxylic acid (see U.S. Patent 3,087,844). The first type of polymer may be exemplified by the formula:

$$\text{HOOC—Q—COOH}$$

wherein Q is a polymer chain, as for example a polymer of a conjugated diene such as 1,3-butadiene. The second type of polymer may be exemplified by a copolymer of 1,3-butadiene and acrylic acid. Utility in this capacity is surprising, since many polyaziridinyl compounds are unstable and undergo polymerization on standing, whereas the present compounds, for the most part, are stable at room temperature for extended periods of time. The compound of Formula I where $R_1$, $R_2$ and $R_3$ are hydrogens, is unstable at room temperature.

The following examples, in which parts and percentages are by weight, are presented to further illustrate the present invention.

EXAMPLE 1

N,N',N"-tris(methoxymethyl)-N,N',N"-tris(2-methyl-1-aziridinylmethyl)melamine

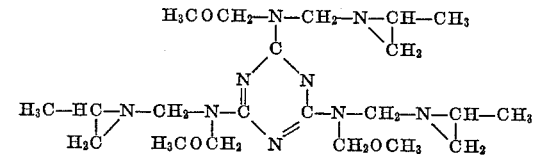

A mixture of 1,2-propyleneimine (17.0 parts, 0.3 mole) and triethylamine (30 parts) is added slowly to a stirred solution of N,N',N"-tris(chloromethyl)-N,N', N" - tris(methoxymethyl)melamine (20.0 parts, 0.05 mole) in benzene (about 25 parts) while maintaining a reaction temperature below 15° C. by external cooling. When the addition is finished, the reaction mixture is stirred at about 20° C. for one hour. After separation of insolubles, chiefly triethylamine hydrochloride, by filtration, the solvent and unreacted 1,2-propyleneimine and triethylamine are removed from the filtrate by distillation in vacuo. The residue, the desired product, is a colorless viscous liquid.

EXAMPLE 2

This Example shows an alternative preparation of the compound of Example 1.

A solution of N,N',N''-tris(chloromethyl)-N,N',N''-tris(chloromethyl) - N,N',N'' - tris(methoxymethyl)melamine (20 parts, 0.05 mole) in benzene (20.0 parts) is added to a stirred mixture of 1,2-propyleneimine (17.0 parts, 0.3 mole) and triethylamine (30 parts) with external cooling to maintain a temperature below 15° C. The reaction mixture is then stirred at about 40° C. for 30 minutes. The insolubles are filtered off, and the product is obtained as a viscous liquid after the volatile materials are removed by distillation.

EXAMPLE 3

N,N',N''-tris(methoxymethyl)-N,N',N''-tris(2,2-dimethyl-1-aziridinylmethyl)melamine

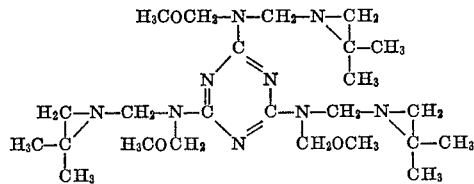

The general procedure of Example 2 is followed substituting 1,2-butyleneimine (17.0 parts) for the 1,2-propyleneimine. The product is a clear, viscous liquid.

EXAMPLE 4

N,N',N''-tris(methoxymethyl)-N,N',N''-tris(2-ethyl-1-aziridinylmethyl)melamine

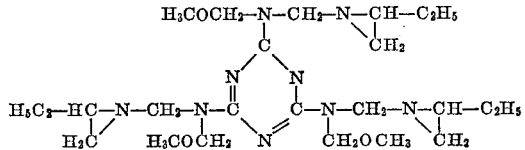

The general procedure of Example 2 is followed, substituting 1,2-butyleneimine (17.0 parts) for the 1,2-propyleneimine. The product is a clear, viscous liquid.

EXAMPLE 5

N,N',N''-tris(methoxymethyl)-N,N',N''-tris(1-aziridinylmethyl)melamine

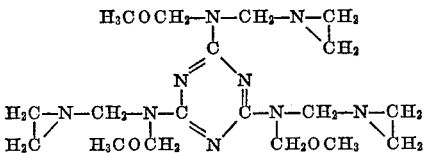

The general procedure of Example 2 is followed substituting ethyleneimine (17.0 parts) for the 1,2-propyleneimine. The product is a viscous liquid. This product is less stable than those of the preceding examples and is found to slowly polymerize upon standing at room temperature.

EXAMPLE 6

A mixture of a carboxy-terminated polybutadiene having a molecular weight of 3800 (20.0 parts) and the product of Example 1 (2.6 parts) is heated at 55° C. An elastomeric polymer is obtained after 24 hours. This indicates that the product of Example 1 acted to cross-link the carboxy-terminated polybutadiene.

EXAMPLE 7

An equivalent amount of the carboxy-terminated copolymer of 1,3-butadiene and acrylic acid is substituted in the procedure of Example 6. A cross-linked elastomer is obtained.

We claim:

1. A compound of the formula:

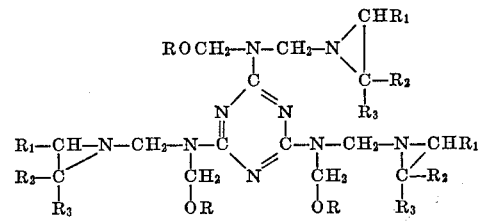

wherein R is lower alkyl and each of the $R_1$, $R_2$ and $R_3$ symbols is a member selected from the group consisting of hydrogen and lower alkyl.

2. A process for preparing the compound of claim 1 which comprises reacting one mole of N,N',N''-tris(halomethyl)-N,N',N''-tris(alkoxymethyl)melamine of the formula:

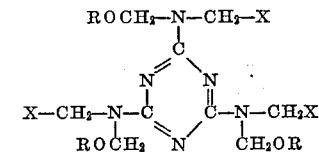

wherein R is lower alkyl and X is a halogen with three moles of an ethyleneimine of the formula:

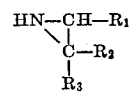

wherein each of $R_1$, $R_2$ and $R_3$ is a member selected from the group consisting of hydrogen and lower alkyl.

3. The method of curing a carboxy-terminated rubbery polymer characterized by the use of a compound of claim 1 as the cross-linkage agent.

4. The method of claim 3 wherein the carboxy-terminated rubbery polymer is a carboxy-terminated polymer of 1,3-butadiene.

5. The method of claim 3 wherein the carboxy-terminated rubbery polymer is the copolymer of 1,3-butadiene and acrylic acid.

References Cited

UNITED STATES PATENTS 3,214,421 10/1965 Mahan _____ 260—82.1
3,223,681 12/1965 Rambosek _____ 260—239 E JOSEPH L. SCHOFER, *Primary Examiner.*

DANIEL K. DENENBERG, *Assistant Examiner.*

UNITED STATES PATENT OFFICE
CERTIFICATE OF CORRECTION

Patent No. 3,378,535

April 16, 1968

Joseph Adrian Hoffman et al.

It is certified that error appears in the above identified patent and that said Letters Patent are hereby corrected as shown below:

Column 3, line 36, "1,2-butyleneimine" should read -- 2-methyl-1,2-propyleneimine --; line 36, cancel "the 1,2-pro".

Signed and sealed this 14th day of October 1969.

(SEAL)
Attest:

Edward M. Fletcher, Jr.
Attesting Officer

WILLIAM E. SCHUYLER, JR.
Commissioner of Patents